United States Patent
Cheung et al.

(10) Patent No.: US 9,648,066 B2
(45) Date of Patent: May 9, 2017

(54) PEER TO PEER PROVISIONING OF DATA ACROSS NETWORKS

(71) Applicant: The Boeing Company, Chicago, IL (US)

(72) Inventors: William Cheung, Brisbane (AU); Leighton Carr, Brisbane (AU)

(73) Assignee: The Boeing Company, Chicago, IL (US)

( * ) Notice: Subject to any disclaimer, the term of this patent is extended or adjusted under 35 U.S.C. 154(b) by 167 days.

(21) Appl. No.: 14/532,958

(22) Filed: Nov. 4, 2014

(65) Prior Publication Data

US 2016/0065636 A1    Mar. 3, 2016

Related U.S. Application Data

(60) Provisional application No. 62/044,147, filed on Aug. 29, 2014.

(51) Int. Cl.
| | | |
|---|---|---|
| *H04L 29/06* | (2006.01) | |
| *H04L 29/08* | (2006.01) | |
| *H04L 12/26* | (2006.01) | |

(52) U.S. Cl.
CPC .......... *H04L 65/4084* (2013.01); *H04L 43/00* (2013.01); *H04L 65/1069* (2013.01);
(Continued)

(58) Field of Classification Search
CPC . H04L 65/4084; H04L 43/00; H04L 65/1069; H04L 65/4007; H04L 65/4069;
(Continued)

(56) References Cited

U.S. PATENT DOCUMENTS

| | | | |
|---|---|---|---|
| 8,832,251 B2 * | 9/2014 | George | ............... H04L 61/2564 |
| | | | 709/203 |
| 9,037,657 B2 * | 5/2015 | Nieh | ..................... H04L 67/104 |
| | | | 709/204 |

(Continued)

FOREIGN PATENT DOCUMENTS

FI    WO 2016015747 A1 *    2/2016    ............. H04L 69/14

OTHER PUBLICATIONS

European Patent Office, European Search Report dated Feb. 1, 2016 for EP Application 15182145.1-1853.

(Continued)

*Primary Examiner* — Uzma Alam
(74) *Attorney, Agent, or Firm* — Duft Bornsen & Fettig, LLP

(57) ABSTRACT

Systems and methods are provided for flight simulators that share video via peering networks. One embodiment includes a flight tracking controller and connection controller. The flight tracking controller receives static images that represent video feeds from a plurality of flight simulators, transmits the static images to a monitoring entity, and receives a response from the monitoring entity selecting a video feed represented by a static image from a flight simulator. The response identifies multiple candidate paths for streaming the selected video feed from the flight simulator to the monitoring entity across a packet switched network. The connection controller forwards the response to the flight simulator, receives a confirmation from the flight simulator that confirms one of the candidate paths, and forwards the confirmation to the monitoring entity in order to establish a peer-to-peer connection for streaming the selected video feed directly between the flight simulator and the monitoring entity.

20 Claims, 7 Drawing Sheets

(52) U.S. Cl.
CPC ...... *H04L 65/4007* (2013.01); *H04L 65/4069* (2013.01); *H04L 67/104* (2013.01); *H04L 67/1042* (2013.01); *H04L 67/1063* (2013.01); *H04L 67/1078* (2013.01); *H04L 67/1093* (2013.01); *H04L 67/16* (2013.01); *H04L 67/2814* (2013.01); *H04L 67/327* (2013.01)

(58) Field of Classification Search
CPC ............... H04L 67/104; H04L 67/1042; H04L 67/1078; H04L 67/1093; H04L 67/16
See application file for complete search history.

(56) References Cited

U.S. PATENT DOCUMENTS

| | | | |
|---|---|---|---|
| 2005/0108373 A1* | 5/2005 | Dewey | H04L 67/104 709/223 |
| 2007/0064702 A1 | 3/2007 | Bates et al. | |
| 2007/0083527 A1* | 4/2007 | Wadler | G06F 17/30852 |
| 2008/0052742 A1* | 2/2008 | Kopf | H04N 5/44591 725/34 |
| 2008/0163303 A1* | 7/2008 | Chou | H04N 7/163 725/46 |
| 2009/0013059 A1* | 1/2009 | Partaker | H04L 65/1096 709/217 |
| 2009/0094360 A1* | 4/2009 | Moorer | H04L 12/1822 709/224 |
| 2009/0324199 A1* | 12/2009 | Haitsma | G06K 9/00744 386/241 |
| 2010/0011297 A1* | 1/2010 | Tsai | G06F 17/30849 715/721 |
| 2010/0202761 A1* | 8/2010 | Bhogal | G11B 27/10 386/241 |
| 2010/0332675 A1* | 12/2010 | Ljunggren | H04N 21/4788 709/231 |
| 2011/0169935 A1* | 7/2011 | Henriksen | A61B 3/12 348/78 |
| 2011/0219137 A1* | 9/2011 | Yang | H04L 29/12103 709/231 |
| 2011/0246471 A1* | 10/2011 | Rakib | G11B 27/28 707/741 |
| 2012/0066368 A1 | 3/2012 | Li et al. | |
| 2012/0215851 A1* | 8/2012 | Wu | H04L 67/104 709/205 |
| 2012/0259988 A1* | 10/2012 | Erringer | H04L 67/104 709/228 |
| 2013/0132527 A1* | 5/2013 | Asher | H04L 65/60 709/219 |
| 2013/0246616 A1* | 9/2013 | Park | H04L 47/808 709/224 |
| 2013/0280678 A1* | 10/2013 | Towers | G09B 9/10 434/38 |
| 2013/0307990 A1* | 11/2013 | Wiles | G08B 25/00 348/159 |
| 2014/0095608 A1* | 4/2014 | Mandalia | G06F 17/30038 709/204 |
| 2014/0108609 A1 | 4/2014 | Duong et al. | |
| 2014/0149512 A1* | 5/2014 | Leitch | H04L 67/1061 709/204 |
| 2014/0310586 A1* | 10/2014 | Lewis | G06F 17/241 715/232 |
| 2015/0248194 A1* | 9/2015 | Simpson | H04L 67/1097 715/719 |

OTHER PUBLICATIONS

Vadaar, Software to record, stream and review your simulations, © 2014 ImmersaView Pty Ltd.
Vadaar, Software to record, stream and review your simulations, Key Features, © 2014 ImmersaView Pty Ltd.
Vadaar, Video over IP Software, Immersaview.
Jul. 7, 2016 Canadian Office Action, Application 2896226, Peer to Peer Provisioning of Data Across Networks.

* cited by examiner

EXAMPLE NODE LIST

| NODE | ROLE | IP ADDRESS | IMAGE |
|---|---|---|---|
| 1 | SENDER | 55.0.015 | IMAGE 1 |
| 2 | SENDER | 55.153.72.94 | IMAGE 2 |
| 3 | SENDER | 55.197.253.12 | IMAGE 3 |
| 4 | SENDER | 130.76.64.18 | IMAGE 4 |
| 5 | VIEWER | 130.76.64.19 | N/A |
| 6 | VIEWER | 144.113.0.22 | N/A |
| 7 | RECORDER | 144.113.122.99 | N/A |

EXAMPLE RESPONSE

| CONNECT WITH | AS... | PATHS |
|---|---|---|
| NODE A | VIEWER | ICE A, ICE B, ICE C |

PEER TO PEER PROVISIONING OF DATA ACROSS NETWORKS

This application claims priority to U.S. Provisional Patent Application No. 62/044,147, entitled "PEER TO PEER PROVISIONING OF DATA," filed on Aug. 29, 2014, and incorporated herein by reference.

FIELD

The disclosure relates to the field of peer to peer networking.

BACKGROUND

When a user wishes to transmit large amounts of video data (e.g., in real time) to a number of viewers, there are multiple imperfect solutions that are available. For example, the user may implement a physical switching matrix to act as a dedicated central hub to distribute video data. In such a system, sources of video data in the network are connected to the network via a direct physical connector using a technology such as High-Definition Multimedia Interface (HDMI). The physical switching matrix then splits the source video to one or more desired locations for review. However, the expense of such physical cabling and switching hardware may be prohibitive.

For example, hardware capture is limited by the capacity of the physical switching matrix, and in most cases there is a limit of four inputs and four outputs. Highly specialized hardware can implement more input/output ports, but the costs increases exponentially as more ports are added, quickly becoming prohibitive. Furthermore, long video cables may degrade the quality of a video signal, making it functionally impossible to provide video data to remote locations.

An alternate solution is to route video data over an Internet Protocol (IP) network. However, such a solution may fail to provide multiplatform support or real time desktop capture for sharing with others. Thus, users continue to seek out new video streaming/provisioning solutions.

SUMMARY

Embodiments described herein provide a signaling server capable of registering nodes on a peer-to-peer network. The signaling server may then help to establish peer-to-peer connections with the nodes in order to provide video data. After a connection is established via the signaling server, communications for the peer-to-peer connections are sent directly between peer devices without traveling through the signaling server. This in turn allows video data to be quickly and efficiently transferred along the peer-to-peer connection.

One embodiment is a system that facilitates peer-to-peer connections for monitoring video feeds from flight simulators. The system includes a flight tracking controller and a connection controller. The flight tracking controller is able to receive static images that represent video feeds from a plurality of flight simulators, to transmit the static images to a monitoring entity, and to receive a response from the monitoring entity selecting a video feed represented by a static image from a flight simulator, where the response identifies multiple candidate paths for streaming the selected video feed from the flight simulator to the monitoring entity across a packet switched network. The connection controller is able to forward the response to the flight simulator, to receive a confirmation from the flight simulator that confirms one of the candidate paths, and to forward the confirmation to the monitoring entity in order to establish a peer-to-peer connection for streaming the selected video feed directly between the flight simulator and the monitoring entity.

Another embodiment is a method for sharing video feeds from flight simulators on a peer-to-peer network. The method includes receiving static images that represent video feeds from a plurality of flight simulators, transmitting the static images to a monitoring entity, and receiving a response from the monitoring entity selecting a video feed represented by a static image from a flight simulator. The response identifies multiple candidate paths for streaming the selected video feed from the flight simulator to the monitoring entity across a packet switched network. The method also includes forwarding the response to the flight simulator, receiving a confirmation from the flight simulator that confirms one of the candidate paths, and forwarding the confirmation to the monitoring entity in order to establish a peer-to-peer connection for streaming the selected video feed for a flight directly between the flight simulator and the monitoring entity.

Another embodiment is a non-transitory computer readable medium embodying programmed instructions which, when executed by a processor, are operable for performing a method for sharing video feeds from flight simulators on a peer-to-peer network. The method includes receiving static images that represent video feeds from a plurality of flight simulators, transmitting the static images to a monitoring entity, and receiving a response from the monitoring entity selecting a video feed represented by a static image from a flight simulator. The response identifies multiple candidate paths for streaming the selected video feed from the flight simulator to the monitoring entity across a packet switched network. The method also includes forwarding the response to the flight simulator, receiving a confirmation from the flight simulator that confirms one of the candidate paths, and forwarding the confirmation to the monitoring entity in order to establish a peer-to-peer connection for streaming the selected video feed for a flight directly between the flight simulator and the monitoring entity.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 5 is a diagram illustrating an exemplary list of nodes maintained by a signaling server in an exemplary embodiment.

FIG. 6 is diagram illustrating a response from a peer node in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
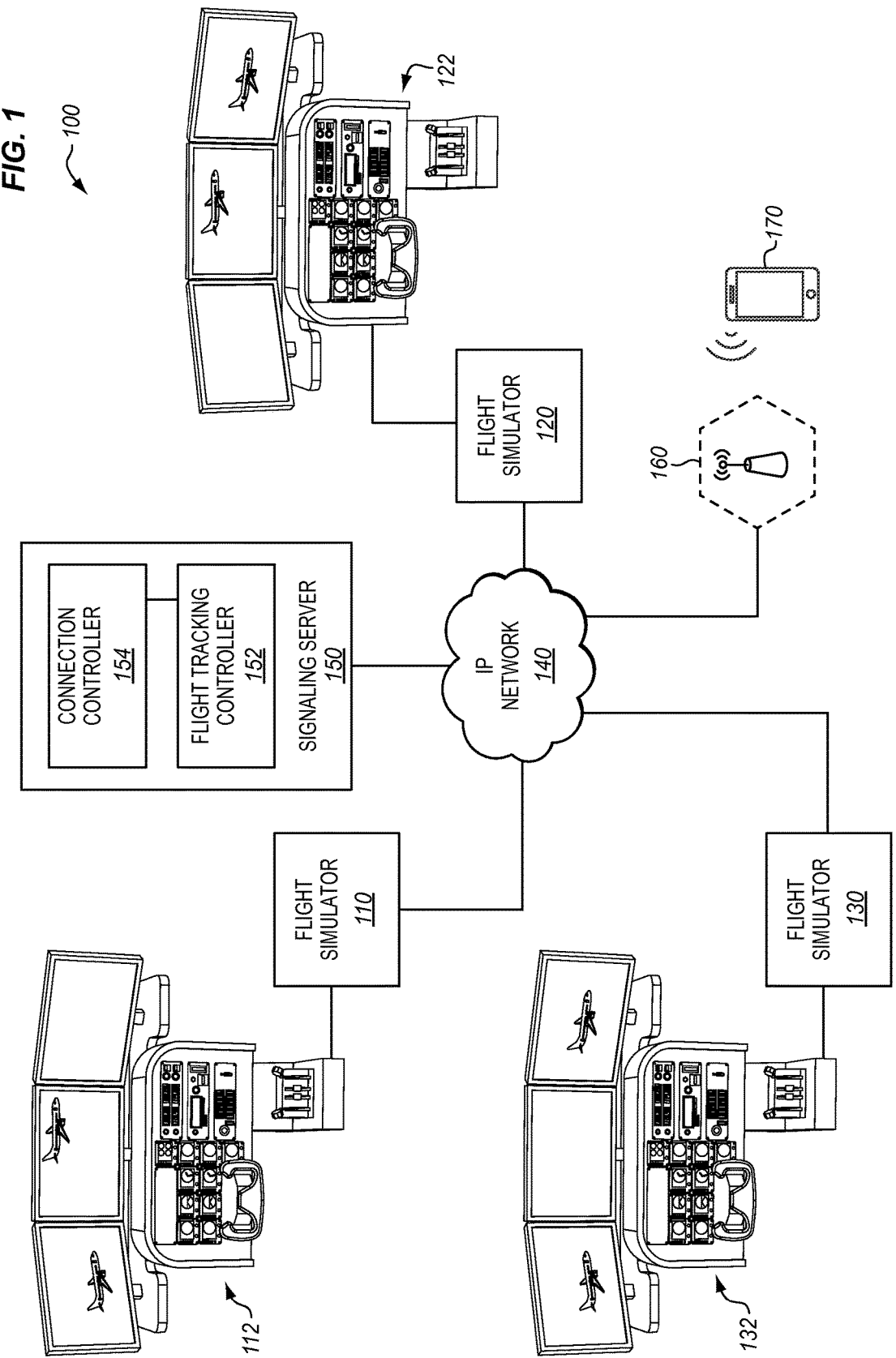
FIG. 1 is a block diagram of a peer-to-peer network in an exemplary embodiment.

FIG. 1 is a block diagram of a peer-to-peer network 100 in an exemplary embodiment. Network 100 includes multiple flight simulators (110, 120, 130) that operate as peer nodes, and a signaling server 150 that coordinates the establishment of video streaming connections between peer nodes in order to provide video feeds from flight simulators (110, 120, 130). After being registered, the flight simulators may establish connections with other peer nodes that operate as monitoring entities (e.g., mobile device 170, via a cellular network base station 160 or a WiFi hot spot) in order to transmit video feeds for simulated flights (as shown in 112, 122, 132) to those other peer nodes via Internet Protocol (IP) network 140. A monitoring entity may be used for viewing simulated flights from one or more flight simulators, allowing for simulated flights to be evaluated and critiqued by users in remote locations.

Network 100 provides a benefit over prior systems, because it enables flight simulators to operate as nodes on a peer-to-peer network in order to exchange video feeds and/or other simulator data (e.g., audio, metadata, etc.) for simulated flights. In particular, network 100 has been enhanced with signaling server 150, which is capable of setting up direct peer-to-peer connections between flight simulators and monitoring entities, which in turn allows for the video feeds to be reviewed and analyzed from any desired location.

In this embodiment, signaling server 150 includes flight tracking controller 152, which determines which flight simulators are presently available to provide video feeds for simulated flights. Signaling server 150 also includes connection controller 154, which is capable of facilitating the establishment of direct peer-to-peer connections between a flight simulator and other peer nodes. A memory of signaling server 150 may store lists of nodes (e.g., flight simulators and/or monitoring entities) that have registered with signaling server 150, and similar information indicating ongoing connections between the nodes of network 100. Controllers 152 and 154 may be implemented as custom circuitry, as a processor executing programmed instructions, or some combination thereof.

Illustrative details of the operation of network 100 will be discussed with regard to FIG. 2. Assume, for this embodiment, that each flight simulator (110, 120, and 130) is actively being operated to immerse a pilot in a simulated flight. During a simulated flight, video data is generated by the flight simulator in real time at a rate of many frames per second, and this video data is presented to the user in order to show the user a virtual training environment. For example, the video feed may present a virtual landscape to the user, complete with simulated aircraft, mountains, lakes and rivers.

Many flight simulators are cramped environments because they simulate the actual cockpit of a known model of aircraft. Therefore, if a person wishes to review the actions of a pilot in response to their simulated environment, options would normally be limited, as in-person review of simulated flights is often an impossibility. To address this issue, each flight simulator may send a registration message to flight tracking controller 152 (e.g., via a known IP address). These registration messages will be used by flight tracking controller 152 to determine what flight simulators are generating video feeds that may currently be reviewed, and/or how to access those flight simulators. For example, each registration message may include a user name for the pilot who is operating the simulator, an IP address for the simulator, and/or a tag indicating that the flight simulator is prepared to actively send a feed of video data to other peer nodes on the network.

Each flight simulator also sends static images, representing a state of the video feed from the flight simulator at a point in time, to signaling server 150. These images use less bandwidth than an actual streaming video feed, yet also enable a reviewer to quickly identify and distinguish the various flight simulators.

Figure 2:
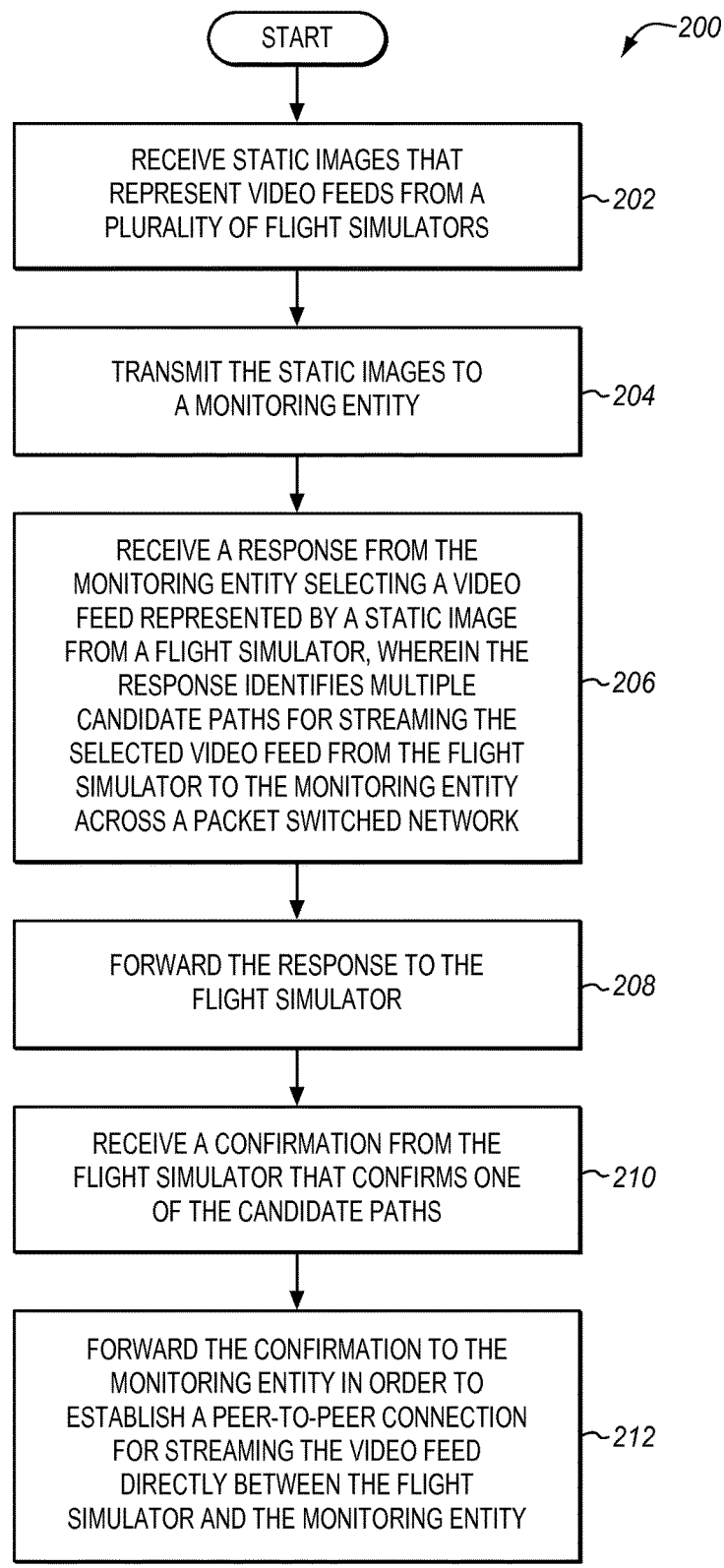
FIG. 2 is a flow chart for managing a signaling server of a peer-to-peer network exemplary embodiment.

FIG. 2 is a flow chart 200 for managing a signaling server of a peer-to-peer network exemplary embodiment. The steps of method 200 are described with reference to network 100 of FIG. 1, but those skilled in the art will appreciate that method 200 may be performed in other systems. The steps of the flowcharts described herein are not all inclusive and may include other steps not shown. The steps described herein may also be performed in an alternative order.

According to FIG. 2, in step 202, flight tracking controller 152 receives the static images from the flight simulators (e.g., as part of the registration requests from those flight simulators). The static images each represent a video feed from a flight simulator. Flight tracking controller 152 may further register each flight simulator, along with tracking information for that flight simulator indicating how to contact the flight simulator via IP network 140.

At some point in the future, a monitoring entity (e.g., smartphone 170) may attempt to register with signaling server 150. In order to indicate the flight simulators that are presently available for monitoring, flight tracking controller 152 transmits the static images to the monitoring entity in step 204, along with information identifying each registered flight simulator (e.g., an IP address for each available flight simulator). A user at the monitoring entity may then choose a video feed based on its corresponding static image. Based on the identifying information for the chosen flight simulator, the monitoring entity (or, in one embodiment, connection controller 154) determines multiple candidate paths for streaming the chosen video feed from the flight simulator to the monitoring entity via IP network 140. The monitoring entity sends a response selecting a video feed represented by a static image from a flight simulator, and the response identifies the candidate paths discussed above. In step 206, connection controller 154 receives the response from the monitoring entity.

Connection controller 154 identifies the flight simulator based on the response, and forwards the response to the flight simulator (step 208). Connection controller 154 may further update a memory at signaling server 150 in order to indicate that a connection is presently being offered to the flight simulator. In step 210, connection controller 154 receives a confirmation from the flight simulator that confirms one of the candidate paths offered in step 206, and in step 212, connection controller 154 forwards the confirmation to the monitoring entity. This act completes the establishment of a peer-to-peer connection for streaming the video feed directly between the flight simulator and the monitoring entity. Thus, the path for the peer-to-peer connection does not traverse through signaling server 150, and yet signaling server 150 is aware of ongoing peer-to-peer connections between registered devices.

The method of FIG. 2 provides an advantage over prior systems, because it enables flight simulators to utilize peer-to-peer networking techniques in order to share video feeds that represent simulated flights. This in turn eliminates the need for reviewers to be located physically close to pilots who are undergoing simulator training.

Figure 3:
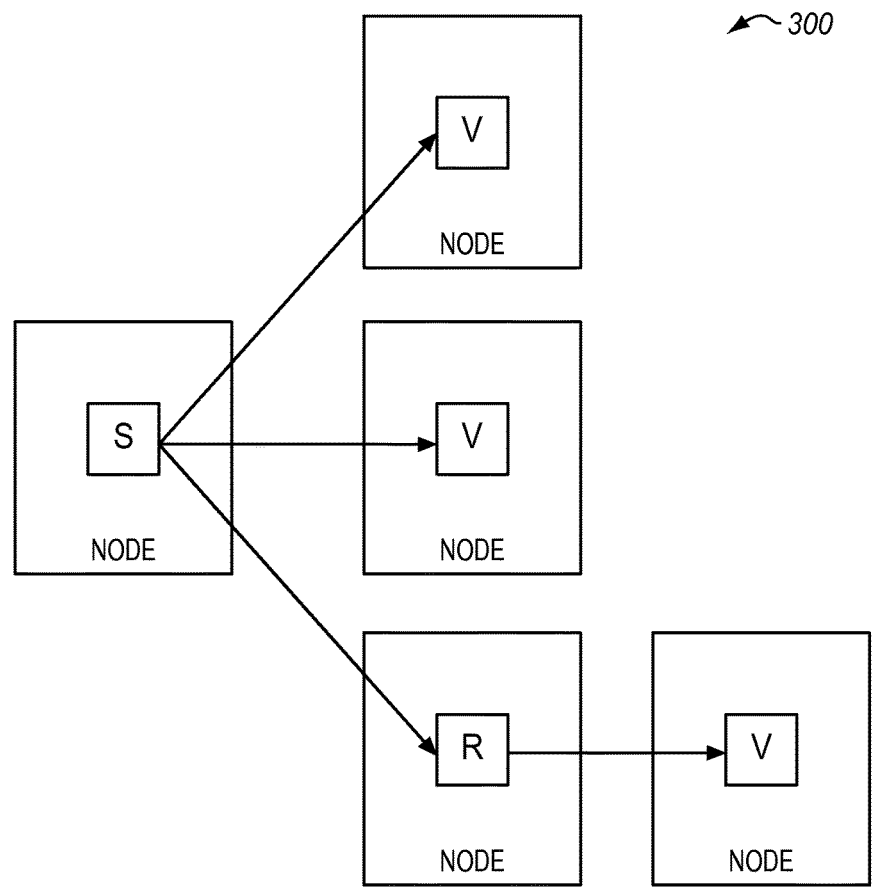
FIGS. 3-4 are block diagrams illustrating relationships between peer nodes in an exemplary embodiment.
Figure 4:
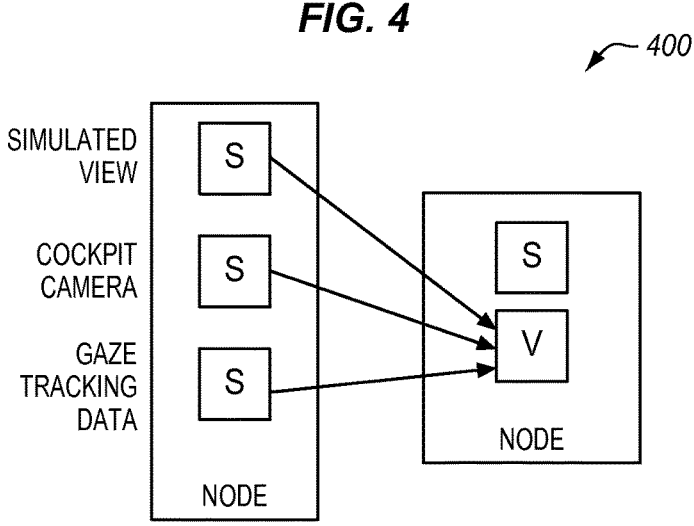

FIGS. 3-4 are block diagrams 300-400 illustrating relationships between peer nodes in an exemplary embodiment. As shown in FIGS. 3-4, each peer node may act as a "sender" (S), "recorder" (R), and/or "viewer" (V). As used herein, a sender is a node that sources video content/data (e.g., real time video content), providing the content to other nodes. The flight simulators described in FIG. 1 operate as senders. Viewers serve to display/render any received video data to a user, and recorders record the video data for later review. The monitoring entity described for FIG. 2 operates as a viewer. In some embodiments, the status of each node as a sender, recorder, or viewer may change over time as desired. For example, a supervisor may sit in a flight simulator to review a video feed from a pilot who is actively engaged in a simulated flight at a remote location (meaning that the flight simulator used by the supervisor acts as a viewer). Then, the supervisor may leave the flight simulator, and a pilot may enter the flight simulator in order to be reviewed (thus, the flight simulator changes its role from viewer to sender).

As used herein, a "node" may comprise any suitable system for receiving and provisioning video data with other peers via an IP network. For example, a node may comprise dedicated circuitry, a processor implementing instructions stored in memory operating on a blade server, etc. In one embodiment, each node is implemented as a virtual machine operating on a processor and memory. In one embodiment, each node is implemented using the Web Real-Time Communication (WebRTC) Application Programming Interface (API) drafted by the World Wide Web Consortium (W3C). Such implementations are therefore Operating System (OS) and application agnostic. In one embodiment, a node may implement any of various different operating systems and applications, so long as WebRTC is used to bridge these different operating environments. By using such web based technology, client software may be distributed and run any platform and operating system supporting a web browser.

FIG. 4 illustrates a situation where a single node (in this case, a flight simulator) operates as a sender to send multiple feeds of data to a remote viewer. In this embodiment, the viewer receives a simulated view of the surrounding environment displayed to a pilot by the flight simulator, as well as a video feed for a cockpit camera that is viewing the pilot. A feed of metadata from a gaze tracker is also provided, and may be overlaid on top of the simulated view to show where the pilot is looking at a point in time.

In a further embodiment, each flight simulator is capable of utilizing its processing resources to perform the following functions:

Capture—The ability to capture various forms of data, e.g. video from screens, audio from microphones or data from sensors.

Transport—The ability to transport captured data in real-time across the network directly between nodes.

Duplicate—The ability to configure a single source of data at the flight simulator to be accessed from multiple nodes simultaneously.

Switching—The ability to configure source and destination arrangements between nodes via operator control or user created software commands while a connection is already active on the network.

Integration—The ability to logically group data sources together for capture, recording and replay.

Record—The ability to record data sources.

Replay—The ability to replay previously recorded data.

Each of the functions described above may be implemented by a dedicated application operating on the flight simulator. Furthermore, nodes of the peer network may drop in and/or out of ongoing transmissions as recorders, viewers, or senders as desired. For example, a monitoring entity may communicate with the signaling server and determine what transmissions are currently available/ongoing from the flight simulators. This may occur even if the node is not involved in the actual exchange of data.

In a still further embodiment, flight tracking controller 152 generates a display (e.g., as a web page or network graph) indicating each of the ongoing connections established via connection controller 154. To this end, flight tracking controller may assemble displays similar to those shown in FIGS. 3-4 to illustrate which nodes are presently on the network, and which nodes are presently engaged in communications with each other.

FIG. 5 is a diagram 500 illustrating an exemplary list of nodes maintained by a signaling server in an exemplary embodiment. In this embodiment, nodes are tracked based on an internal node number, the role of the node in the peer-to-peer network, the IP address of the node, and a static image (if any) representing a video feed of the node at a point in time. In this embodiment, the flight simulators operate in the role of senders, while monitoring entities operate in the role of viewers.

FIG. 6 is diagram 600 illustrating a response from a peer node in an exemplary embodiment. In this embodiment, a monitoring entity sends a message selecting a node to connect with, indicating a role to use for the monitoring entity (in this case, "viewer") and multiple Interactive Connectivity Establishment (ICE) paths that may be used for a direct peer-to-peer connection with the selected node.

EXAMPLES

The following examples illustrate scenarios where WebRTC technology is used to implement a peer-to-peer network for reviewing coordinated training exercises between remotely located pilots in flight simulators.

Figure 7:
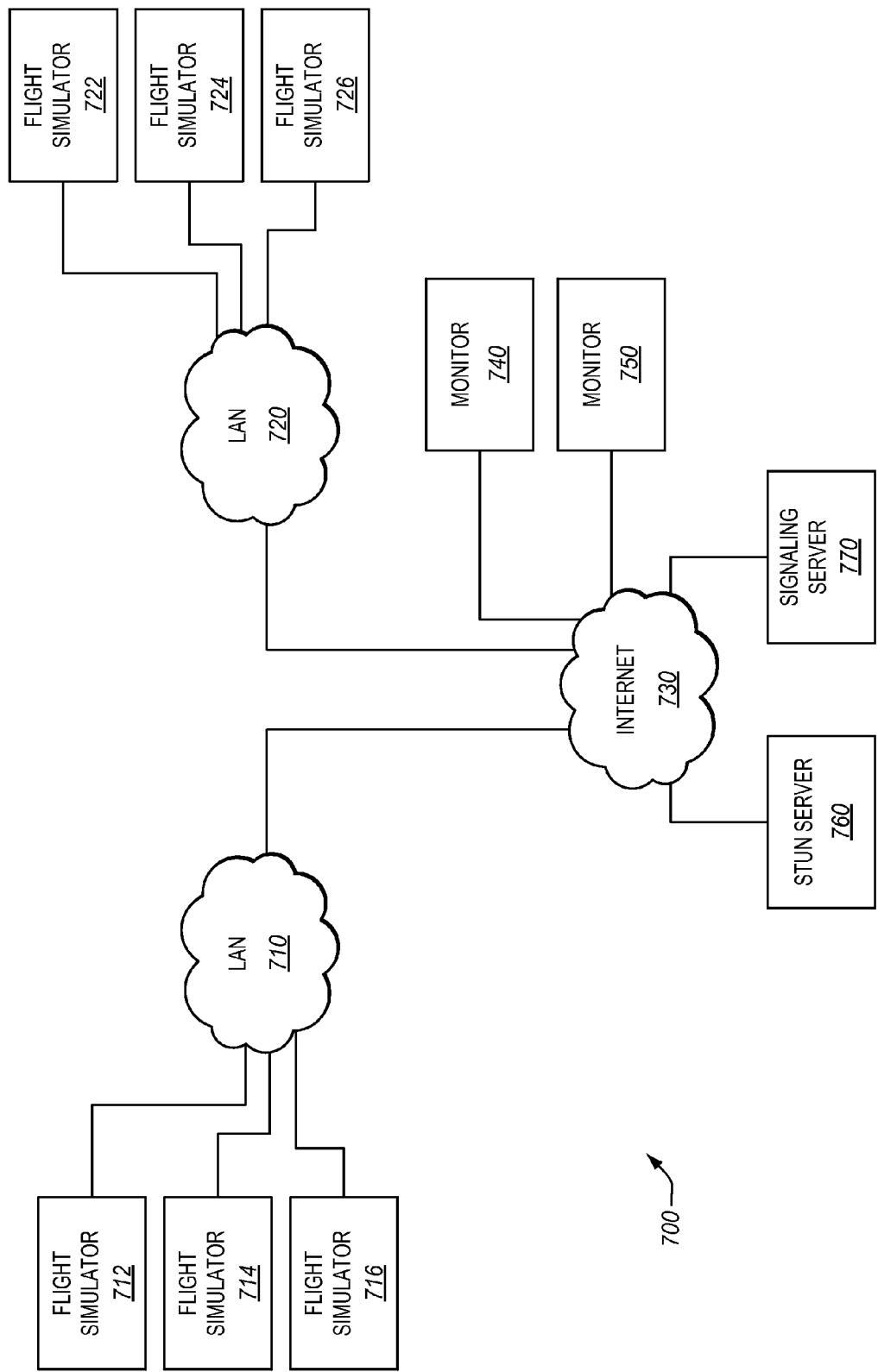
FIG. 7 is a block diagram of a peer-to-peer network architecture in an exemplary embodiment.

In this example, multiple users of flight simulators, located in different countries, are evaluated by supervisors who are remotely located from the pilots. The flight simulator of each pilot implements a network node. FIG. 7 is a block diagram 700 of a peer-to-peer network architecture utilized in this example. According to FIG. 7, multiple flight simulators in North America (712, 714, 716) are connected via LAN 710 to the Internet 730. Furthermore, multiple flight simulators in Europe (722, 724, 726) are connected via LAN 720 to the Internet 730. Two monitoring computers ("monitors") (750 and 760), located in northern Africa, are used to track the performance of the North American and European pilots during a training exercise. A signaling server 770 coordinates interactions between the monitors and the flight simulators, while a Session Traversal Utilities for NAT (STUN) server is used to facilitate NAT traversal for the flight simulators and monitors.

Each flight simulator generates a video feed that illustrates a cockpit view of a simulated aircraft, and each flight simulator also generates a data feed indicating a location of the pilot's gaze on the cockpit view. The feeds are integrated at the flight simulator, and compressed. The flight simulator nodes then identify signaling server 770 as being located at a known IP address (e.g., as indicated by a network-wide broadcast), and indicate their presence to signaling server 770. Each flight simulator also transmits a message to the signaling server indicating that it is operating as a sender.

In this example, whenever a flight simulator declares itself to signaling server 770, signaling server 770 makes other nodes on the network aware of the existence of the flight simulator by updating a locally stored registry accessible to other peer nodes, or broadcasting the registration information to other nodes. After a peer connection is selected and requested by a node, a WebRTC offer/answer messaging containing NAT information is exchanged between the nodes via the signaling server. Included in this package are custom network handling messages which identify which peer node the video feed is coming from, and which peer node the video feed is going to. WebRTC is designed to work over challenging network conditions with common Internet obstacles such as Firewalls and NAT. This allows usage of the peer network for applications such as remote training and international simulation and testing scenarios which would not be otherwise possible without a VPN (Virtual Private Network).

After the flight simulators indicate their sender status, the signaling server retrieves static images from the flight simulators indicating their current video feeds. Each static image is a screen capture of a video feed from a corresponding flight simulator, and each static image is updated regularly (e.g., every five seconds, in response to specific events, etc.) based on input from the flight simulator to indicate how the video feed is changing over time. The static images, along with the aspect ratios for those static images, are provided to the monitors to enable supervisors to select flight simulator video feeds for viewing. The supervisors operate the monitors to contact and establish a connection with one or more flight simulator at once as a viewer. The monitors then receive video feed and gaze data from each of the flight simulators being reviewed. Each monitor integrates the gaze tracker data into the video data for each node, and then displays the integrated feed for each of the pilots on one or more displays for the supervisor. In this manner, even though the supervisors are remotely located from the pilots, and the pilots are remotely located from each other, they may engage in coordinated training exercises together in real-time.

In this example, the establishment of peer-to-peer data connections between the nodes utilizes the WebRTC standard. The nodes utilize WebRTC as a means of video content distribution for generic data handling. Document JSEP (Javascript Session Establishment Protocol) is used to implement and create peer to peer connections via a signaling between applications, utilizing NAT (Network Address Translation) traversal technique ICE (Interactive Connectivity Establishment). Specifically, for each desired connection, a monitor utilizes JSEP techniques to determine and negotiate ICE paths to a specific IP address of a selected flight simulator, and these ICE paths are offered by the monitor to the selected flight simulator via signaling server 770, which forwards the offer onward to the selected flight simulator. The selected flight simulator returns a JSEP acceptance indicating a selected ICE path, which is received at signaling server 770 and forwarded on to the monitor to form a WebRTC connection. WebRTC leaves the implementation of the signaling to the developer by design, providing maximum flexibility of the network configuration.

Figure 8:
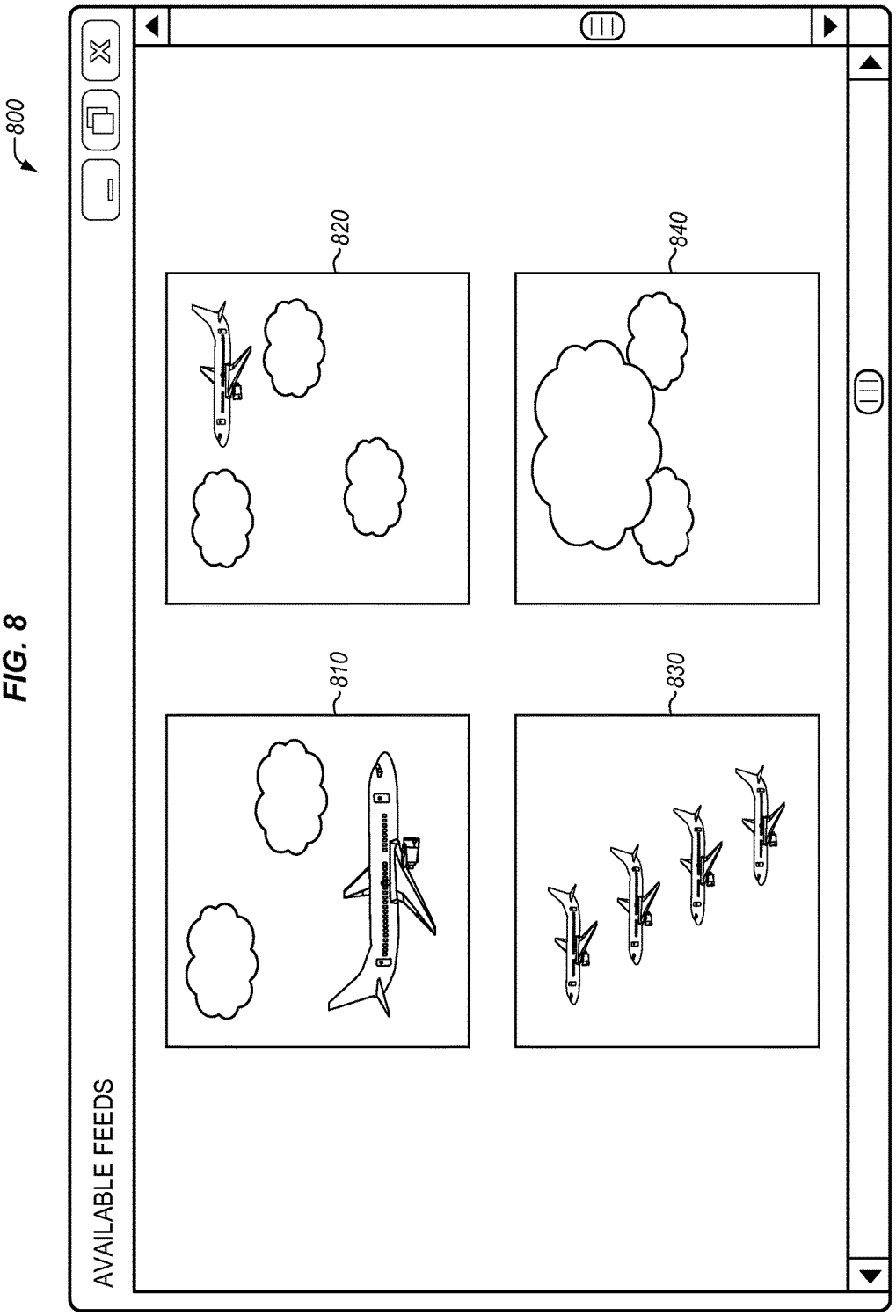
FIG. 8 is a diagram illustrating static thumbnail images that represent video feeds from different flight simulators in an exemplary embodiment.

FIG. 8 is a diagram 800 illustrating static thumbnail images that represent video feeds from different flight simulators in an exemplary embodiment. According to FIG. 8, video feeds from each flight simulator are represented by a different static thumbnail image (810, 820, 830, 840) that is periodically updated (e.g., every ten seconds) by the flight simulators. This technique saves bandwidth, while still allowing a monitoring entity to quickly identify which video feeds are desirable for viewing.

Figure 9:
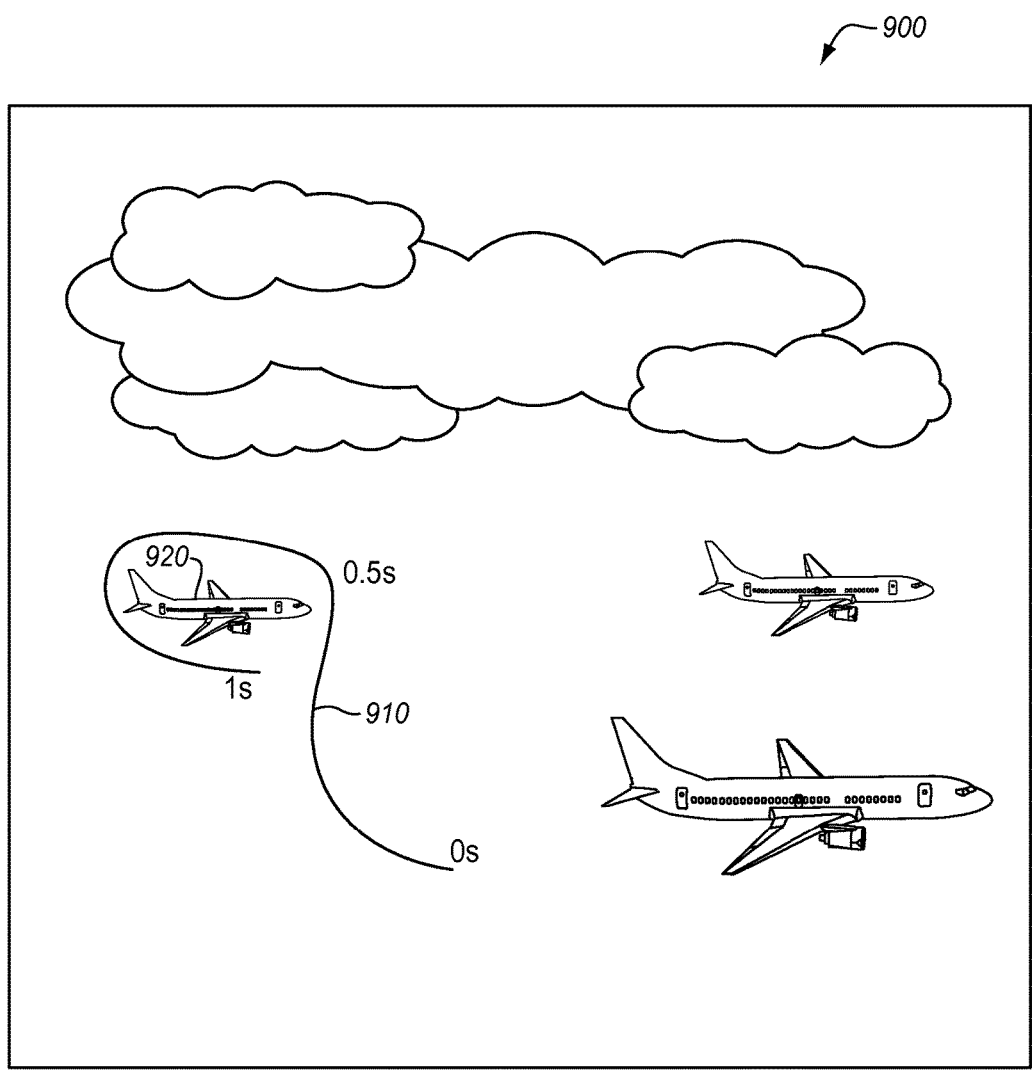
FIG. 9 is a diagram illustrating a real-time feed of video data in an exemplary embodiment.

FIG. 9 is a diagram 900 illustrating a real-time feed of video data in an exemplary embodiment. Specifically, FIG. 9 illustrates a video feed where gaze tracking data is overlaid on top of a video feed. In FIG. 9, gaze tracking data is represented by a "tail" which moves across the video feed. One end of the tail indicates the current gaze of the pilot (i.e., the gaze of the pilot zero seconds ago), while another end of the tail indicates the earlier gaze of the pilot (e.g., one second ago). This type of overlay quickly allows a supervisor to determine whether or not the pilot is adequately responding to the circumstances of the simulated flight.

In this embodiment, further messages are used to allow authentication and prevent impersonation of a peer within the network. For example, users may be assigned to permission levels, and a flight tracking controller may select a subset of flight simulators allowed for viewing by certain users, depending on their permission levels. The flight tracking controller may then selectively send out static images only for the flight simulators that the user has permission to view, while preventing connections that the user is unauthorized to make.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
a tracking controller configured to receive static images that are screen captures of video feeds from a plurality of nodes, to transmit the static images to a monitoring entity, and to receive a response from the monitoring entity selecting a video feed represented by a static image from a node, wherein the response identifies multiple candidate paths for streaming the selected video feed from the node to the monitoring entity across a packet switched network; and
a connection controller configured to forward the response to the node, to receive a confirmation from the node that confirms one of the candidate paths, and to forward the confirmation to the monitoring entity in order to establish a peer-to-peer connection for streaming the selected video feed directly between the node and the monitoring entity.

2. The system of claim 1, wherein:
the tracking controller is configured to transmit the static images to multiple monitoring entities, and to establish peer-to-peer connections between the nodes and the multiple monitoring entities.

3. The system of claim 1, wherein:
the connection controller is configured to establish multiple peer-to-peer connections between the monitoring entity and nodes at once.

4. The system of claim 1, wherein:
the connection controller is configured to establish peer-to-peer connections between a node and multiple monitoring entities at once.

5. The system of claim 1, wherein:
the tracking controller is configured to receive updated static images periodically from the nodes, and to transmit the updated static images to the monitoring entity.

6. The system of claim 1, wherein:
the connection controller is configured to identify each established peer-to-peer connection, and to generate a network graph that represents each established peer-to-peer connection.

7. The system of claim 1, wherein:
the tracking controller is configured to determine a permission level for the monitoring entity, and to select static images to transmit to the monitoring entity based on the permission level.

8. The system of claim 1, wherein:
the tracking controller is configured to identify Internet Protocol (IP) addresses of the nodes, and to transmit the identified IP addresses to the monitoring entity.

9. The system of claim 1, wherein:
the tracking controller is configured to determine an aspect ratio of each static image, and to transmit determined aspect ratios to the monitoring entity.

10. A method comprising:
receiving static images that are screen captures of video feeds from a plurality of nodes;
transmitting the static images to a monitoring entity;
receiving a response from the monitoring entity selecting a video feed represented by a static image from a node, wherein the response identifies multiple candidate paths for streaming the selected video feed from the node to the monitoring entity across a packet switched network;
forwarding the response to the node;
receiving a confirmation from the node that confirms one of the candidate paths; and
forwarding the confirmation to the monitoring entity in order to establish a peer-to-peer connection for streaming the selected video feed directly between the node and the monitoring entity.

11. The method of claim 10, further comprising:
transmitting the static images to multiple monitoring entities; and
establishing peer-to-peer connections between the nodes and the multiple monitoring entities.

12. The method of claim 10, further comprising:
establishing multiple peer-to-peer connections between the monitoring entity and nodes at once.

13. The method of claim 10, further comprising:
establishing peer-to-peer connections between a node and multiple monitoring entities at once.

14. The method of claim 10, further comprising:
receiving updated static images periodically from the nodes; and
transmitting the updated static images to the monitoring entity.

15. The method of claim 10, further comprising:
identifying each established peer-to-peer connection; and
generating a network graph that represents each established peer-to-peer connection.

16. The method of claim 10, further comprising:
determining a permission level for the monitoring entity; and
selecting static images to transmit to the monitoring entity based on the permission level.

17. The method of claim 10, further comprising:
identifying Internet Protocol (IP) addresses of the nodes; and
transmitting the identified IP addresses to the monitoring entity.

18. The method of claim 10, further comprising:
determining an aspect ratio of each static image; and
transmitting determined aspect ratios to the monitoring entity.

19. A non-transitory computer readable medium embodying programmed instructions which, when executed by a processor, are operable for performing a method comprising:
receiving static images that are screen captures of video feeds from a plurality of nodes;
transmitting the static images to a monitoring entity;
receiving a response from the monitoring entity selecting a video feed represented by a static image from a node, wherein the response identifies multiple candidate paths for streaming the selected video feed from the node to the monitoring entity across a packet switched network;
forwarding the response to the node;
receiving a confirmation from the node that confirms one of the candidate paths; and
forwarding the confirmation to the monitoring entity in order to establish a peer-to-peer connection for streaming the selected video feed directly between the node and the monitoring entity.

20. The medium of claim 19, wherein the method further comprises:
   transmitting the static images to multiple monitoring entities; and
   establishing peer-to-peer connections between the nodes and the multiple monitoring entities.

\* \* \* \* \*